US009835280B2

(12) United States Patent
Hanner et al.

(10) Patent No.: US 9,835,280 B2
(45) Date of Patent: Dec. 5, 2017

(54) EXPANSION CHAMBER DEVICE FOR CLUTCH PEDAL VIBRATION ATTENUATION IN A HYDRAULICALLY CONTROLLED CLUTCH SYSTEM

(71) Applicant: GM Global Technology Operations LLC, Detroit, MI (US)

(72) Inventors: David T. Hanner, Milford, MI (US); Robert N. Paciotti, White Lake, MI (US); David J. Theis, St. Johns, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 113 days.

(21) Appl. No.: 14/955,616

(22) Filed: Dec. 1, 2015

(65) Prior Publication Data
US 2017/0067590 A1 Mar. 9, 2017

Related U.S. Application Data

(60) Provisional application No. 62/213,863, filed on Sep. 3, 2015.

(51) Int. Cl.
| F16L 55/04 | (2006.01) |
| F16L 55/05 | (2006.01) |
| F16D 25/12 | (2006.01) |
| F16D 48/02 | (2006.01) |

(52) U.S. Cl.
CPC ............ F16L 55/041 (2013.01); F16D 25/12 (2013.01); F16D 48/02 (2013.01); F16L 55/05 (2013.01); F16D 2048/0215 (2013.01); F16D 2300/22 (2013.01)

(58) Field of Classification Search
CPC .. F16D 25/12; F16D 48/02; F16D 2048/0215; F16D 2300/22; F16L 55/041; F16L 55/05; F15B 21/008
See application file for complete search history.

(56) References Cited

U.S. PATENT DOCUMENTS 4,253,542 A * 3/1981 Ruspa ...................... E02F 9/00
181/272
4,924,992 A * 5/1990 Romig ................... F16D 48/02
192/109 F

FOREIGN PATENT DOCUMENTS

DE 102004054792 A1 * 5/2006 ............. F16D 48/02
DE 102006017694 A1 * 11/2006 ............. F16D 48/02
(Continued)

OTHER PUBLICATIONS

Machine translation of DE 102004054792 A1, downloaded from EPO.org on May 24, 2017.*

*Primary Examiner* — Richard Lorence

(57) ABSTRACT

An expansion chamber device for clutch pedal vibration attenuation includes a cylindrical body having an inlet line integrally connected to and penetrating through a first end wall of the body. At an opposite end of the body from the first end wall is a discharge line integrally connected to and penetrating a second end wall of the body. A diameter of the expansion chamber device is approximately 3.8 cm and a length of the expansion chamber device ranges between approximately 10.2 cm to 15.2 cm. The expansion chamber device reduces vehicle and engine vibrations in a path including a clutch pedal over a frequency range between approximately 50 Hz to approximately 225 Hz.

18 Claims, 3 Drawing Sheets

(56) References Cited

FOREIGN PATENT DOCUMENTS

DE 102009049252 A1 * 5/2010 ............. B60K 23/02
KR 20030006113 A * 1/2003

* cited by examiner

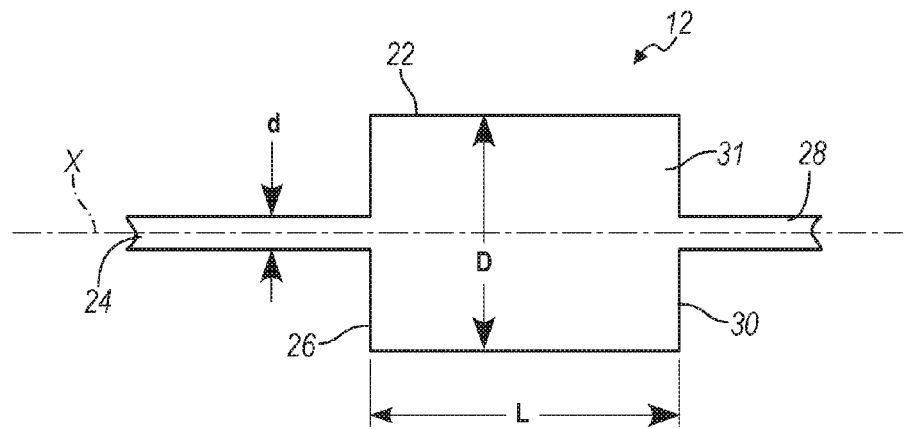
FIG. 2
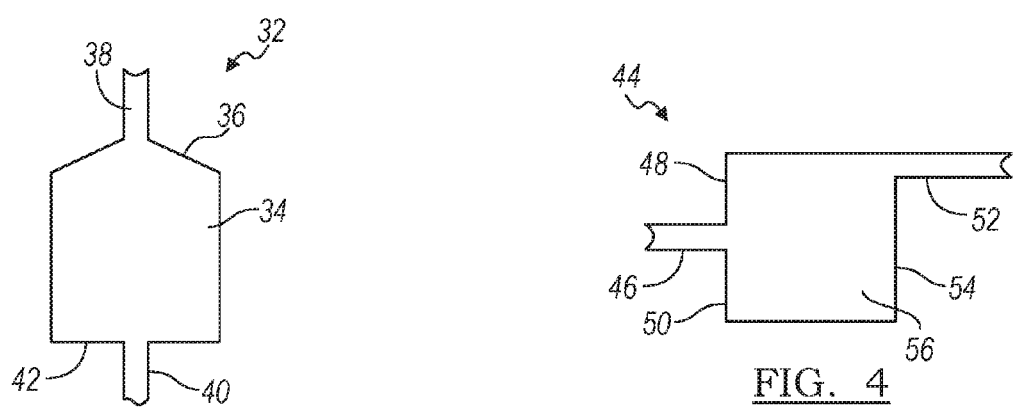
FIG. 3
FIG. 4
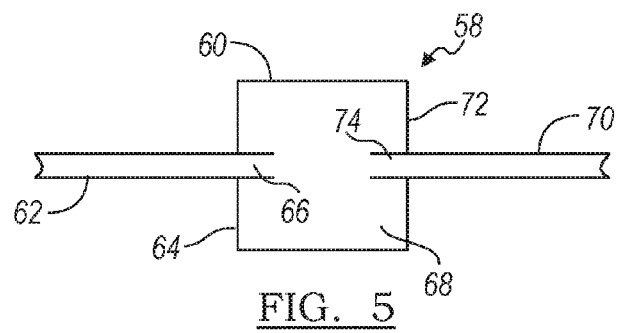
FIG. 5

EXPANSION CHAMBER DEVICE FOR CLUTCH PEDAL VIBRATION ATTENUATION IN A HYDRAULICALLY CONTROLLED CLUTCH SYSTEM

CROSS REFERENCE TO RELATED APPLICATIONS

The present application claims the benefit of U.S. Provisional Patent Application No. 62/213,863, filed on Sep. 3, 2015. The entire disclosure of the above application is incorporated herein by reference.

FIELD

The present disclosure relates to hydraulically controlled clutch systems and more specifically to devices used to attenuate clutch pedal vibration.

BACKGROUND

The statements in this section merely provide background information related to the present disclosure and may or may not constitute prior art.

Many modern motor vehicle manually shifted transmissions utilize controlled hydraulic fluid to engage or disengage a clutch during transmission gear shifting. A clutch pedal is positioned proximate to a vehicle brake pedal in a driver side compartment of the motor vehicle and may include a rigid rod extending from the clutch pedal through a firewall and into an engine compartment of the motor vehicle. A hydraulic fluid line, also designated as a clutch release line, is routed through the engine compartment from a clutch master cylinder to a clutch slave cylinder.

Vehicle and engine vibrations, particularly those associated with the engine and transmission may transfer via the clutch release line to the clutch pedal. System vibrations in a frequency ranging between approximately 50 Hz to approximately 225 Hz may be "felt" by the vehicle operator during clutch pedal operation. These vibrations are undesirable as they lead to a generally negative interpretation of vehicle ride quality.

Attempts have therefore been made to reduce hydraulic clutch release line vibration that is transferred to the clutch pedal. Such attempts include adding features in the clutch release line to absorb or attenuate hydraulic system vibration, including use of a diaphragm attenuator, or a hydraulic de-coupler. Known diaphragm attenuators have a fluid chamber within which is positioned a flexible metal or resilient material diaphragm which absorbs hydraulic fluid energy and thereby attenuates vibration. Such diaphragm attenuators provide incremental improvement in vibration attenuation over a non-attenuated system, but do not achieve a desirable attenuation (approximately 20 dB attenuation), plus they add component parts that may wear over time. Also known to help attenuate clutch release line and clutch pedal vibration are hydraulic de-couplers. Known hydraulic de-couplers include multiple components including releasable body halves and internal moving parts which displace to attenuate hydraulic vibration. Such de-couplers are more effective in achieving vibration attenuation than known diaphragm attenuators, but are expensive and have moving component parts that also may wear over time.

SUMMARY

An expansion chamber device for clutch pedal vibration attenuation includes a cylindrical body having an inlet line integrally connected to and penetrating through a first end wall of the body. At an opposite end of the body a discharge line is integrally connected to and penetrates a second end wall of the body. A diameter "D" of the expansion chamber device is approximately 3.8 cm and a length "L" of the expansion chamber device ranges between approximately 10.2 cm to 15.2 cm.

According to further aspects, the device has no internal moving parts.

According to further aspects, the device provides at least 20 dB of vibration attenuation in a hydraulic clutch line and a hydraulic clutch pedal system, compared to a hydraulic clutch line and a hydraulic clutch pedal system having no vibration attenuation.

According to further aspects, the inlet line and the discharge line penetrate the respective first or second end wall centrally aligned with the wall and co-axially aligned with a longitudinal axis of the body.

According to further aspects, an inner chamber of the cylindrical body is approximately 6 times larger than a diameter of the inlet line and the discharge line.

According to further aspects, wherein the second end wall of the expansion chamber device is a vertically oriented, outwardly tapered wall.

According to further aspects, wherein the second end wall of the expansion chamber device is a substantially flat wall.

According to further aspects, wherein the discharge line is positioned at an upper end or the top center apex of the second end wall.

According to further aspects, the inlet line includes an extending portion which discharges hydraulic fluid away from the first end wall and proximate to a center of an inner chamber.

According to further aspects, the discharge line includes an extending portion which receives hydraulic fluid away from the second end wall and proximate to the center of the inner chamber.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the present disclosure. Moreover, in the figures, like reference numerals designate corresponding parts throughout the views. In the drawings:

FIG. 2 is a diagrammatic front elevational view of the expansion chamber device in accordance with the principles of the present disclosure;

FIG. 3 is a diagrammatic front elevational view of an expansion chamber device in accordance with another aspect of the present disclosure;

FIG. 4 is a diagrammatic front elevational view of an expansion chamber device in accordance with another aspect of the present disclosure;

FIG. 5 is a diagrammatic front elevational view of an expansion chamber device in accordance with another aspect of the present disclosure;

Figure 1:
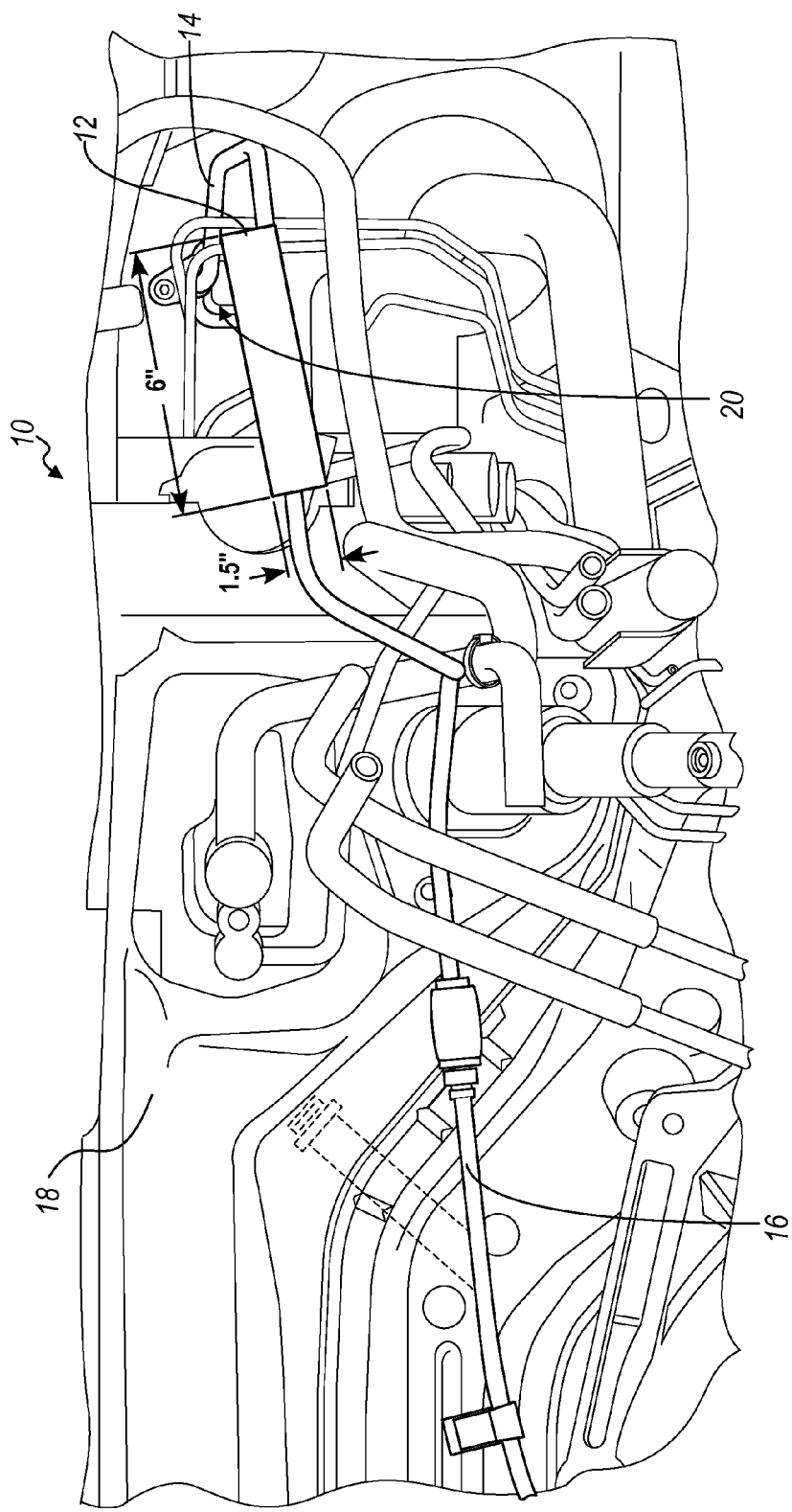
FIG. 1 is a front perspective view of a motor vehicle engine compartment having an expansion chamber device for hydraulic vibration attenuation of the present disclosure.
Figure 6:
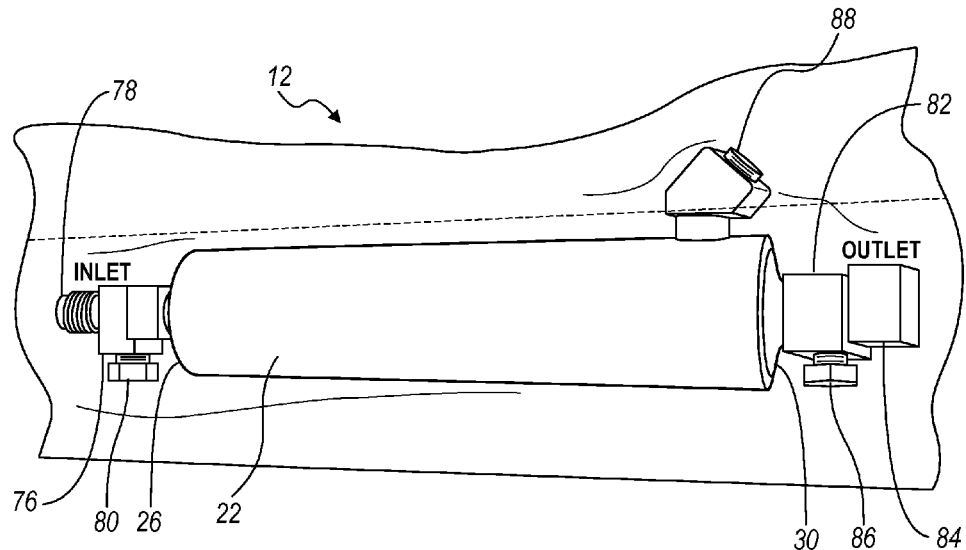
Figure 7:
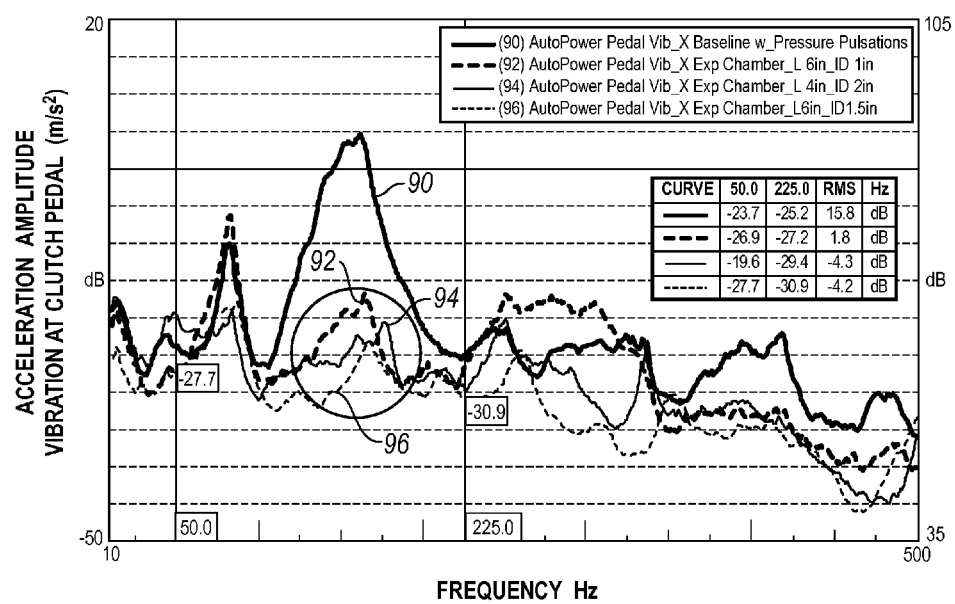

FIG. 6 is a front elevational view of the expansion chamber device of FIG. 1, further including venting components; and FIG. 7 is a graph comparing hydraulic acceleration amplitudes for an expansion chamber device in accordance with aspects of the present disclosure compared to a hydraulic system having no vibration attenuation and two hydraulic systems having expansion chamber devices with modified dimensions.

DETAILED DESCRIPTION

The following description is merely exemplary in nature and is not intended to limit the present disclosure, application, or uses.

With reference to FIG. 1, a motor vehicle engine compartment generally indicated by reference number 10 includes an exemplary expansion chamber device 12 used for clutch pedal vibration attenuation. The expansion chamber device 12 is installed for example in a clutch release line 14 containing a hydraulic fluid (brake fluid), and leads into a clutch slave cylinder line 16, and ultimately to a clutch slave cylinder (not shown). The clutch release line 14 may be a hard pipe or tube, or a flexible hose, and the clutch slave cylinder line 16 is commonly a flexible hose. The expansion chamber device 12 is positioned in the engine compartment 10 forward of a firewall 18, and preferably positioned proximate to a clutch master cylinder 20. This location of the expansion chamber device 12 is not limiting, as the expansion chamber device 12 can be located at any location within the engine compartment 10. The expansion chamber device 12 is itself directly mounted to structure or another component in the engine compartment 10 to limit deflection of the expansion chamber device 12 that may occur due to the mass of the expansion chamber device 12 being substantively greater than a significantly smaller mass and flexibility of the connecting clutch release line 14 or the clutch slave cylinder line 16. The expansion chamber device 12 actively reduces vehicle and engine vibrations in a path including a clutch pedal over a frequency range between approximately 50 Hz to approximately 225 Hz.

Referring to FIG. 2 and again to FIG. 1, according to several aspects, the expansion chamber device 12 includes a cylindrical body 22 having an inlet port or line 24 integrally connected to and penetrating through a first end wall 26 of the body 22. At an opposite end of the body 22 a discharge port or line 28 is integrally connected to and penetrates a second end wall 30 of the body 22. The positions where the inlet line 24 and the discharge line 28 penetrate the respective first or second end wall 26, 28 are shown centrally aligned with the walls and co-axially aligned with a central longitudinal axis "X" of the body 22, however this location is not limiting. According to several aspects, a diameter "D" of the expansion chamber device 12 is approximately 3.8 cm (1.5 in) and a length "L" of the expansion chamber device 12 ranges between approximately 10.2 cm to 15.2 cm (4.0 to 6.0 in), with the preferred length being the greatest length (closest to 15.2 cm) that can be accommodated in the space limitations of the engine compartment 10 of the motor vehicle. According to several aspects, the diameter "D" of the expansion chamber device 12 can vary between approximately 2.5 cm (1.0 in) to approximately 3.8 cm (1.5 in). A diameter "d" of both the inlet line 24 and the discharge line 28 is typically approximately 0.6 cm (0.25 in), therefore the diameter "D" of an inner chamber 31 of the cylindrical body 22 is substantially larger (approximately 6 times larger) than the diameter of the inlet line 24 and the discharge line 28.

Referring to FIG. 3 and again to FIGS. 1 and 2, according to further aspects, an expansion chamber device 32 is modified from the expansion chamber device 12. Expansion chamber device 32 includes a cylindrical body 34 but replaces the flat second end wall 30 of the expansion chamber device 12 with a vertically oriented, outwardly tapered wall 36. By orienting the expansion chamber device 32 with the tapered wall 36 facing vertically upward, a discharge line 38 and an inlet line 40 penetrating a first end wall 42 are also vertically oriented, such that hydraulic fluid in the expansion chamber device 32 will self-vent.

Referring to FIG. 2 and again to FIG. 1, according to several aspects, the expansion chamber device 12 includes a cylindrical body 22 having an inlet port or line 24 integrally connected to and penetrating through a first end wall 26 of the body 22. At an opposite end of the body 22 a discharge port or line 28 is integrally connected to and penetrates a second end wall 30 of the body 22. The positions where the inlet line 24 and the discharge line 28 penetrate the respective first or second end wall 26, 28 are shown centrally aligned with the walls and co-axially aligned with a central longitudinal axis "X" of the body 22, however this location is not limiting. According to several aspects, a diameter "D" of the expansion chamber device 12 is approximately 3.8 cm (1.5 in) and a length "L" of the expansion chamber device 12 ranges between approximately 10.2 cm to 15.2 cm (4.0 to 6.0 in), with the preferred length being the greatest length (closest to 15.2 cm) that can be accommodated in the space limitations of the engine compartment 10 of the motor vehicle. According to several aspects, the diameter "D" of the expansion chamber device 12 can vary between approximately 2.5 cm (1.0 in) to approximately 3.8 cm (1.5 in). A diameter "d" of both the inlet line 24 and the discharge line 28 is typically approximately 0.6 cm (0.25 in), therefore the diameter "D" of an inner chamber 31 of the cylindrical body 22 is substantially larger (approximately 6 times larger) than the diameter of the inlet line 24 and the discharge line 28.

Referring to FIG. 3 and again to FIGS. 1 and 2, according to further aspects, an expansion chamber device 32 is modified from the expansion chamber device 12. Expansion chamber device 32 includes a cylindrical body 34 but replaces the flat second end wall 30 of the expansion chamber device 12 with a vertically oriented, outwardly tapered wall 36. By orienting the expansion chamber device 32 with the tapered wall 36 facing vertically upward, a discharge line 38 and an inlet line 40 penetrating a first end wall 42 are also vertically oriented, such that hydraulic fluid in the expansion chamber device 32 will self-vent.

Referring now to FIG. 4 and again to FIGS. 1 through 3, according to several aspects an expansion chamber device 44 is modified from the expansion chamber device 12. Expansion chamber device 44 includes a horizontal inlet line 46 which can be centrally positioned in a first end wall 48 of a cylindrical body 50. The expansion chamber device 44 repositions a discharge line 52 compared to the discharge line 28 from a center or coaxial to the longitudinal axis of a second end wall 54 to an upper end or the top center apex of the second end wall 54. By orienting the expansion chamber device 44 with the discharge line 52 facing upward, hydraulic fluid in an inner chamber 56 of the cylindrical body 50 will self-vent.

Referring to FIG. 5 and again to FIGS. 1-4, according to further aspects, an expansion chamber device 58 is modified to include a cylindrical body 60 having an inlet port or line 62 integrally connected to and penetrating through a first end wall 64 of the body 60. The inlet line 62 includes an extending portion 66 which discharges hydraulic fluid away from the first end wall 64 and therefore proximate to a center of an inner chamber 68. At an opposite end of the body 60 a discharge port or line 70 is integrally connected to and penetrates a second end wall 72 of the body 60. The discharge line 70 similarly includes an extending portion 74 which receives hydraulic fluid away from the second end wall 72 and proximate to the center of the inner chamber 68. The positions where the inlet line 62 and the discharge line 70 penetrate the respective first or second end wall 64, 72 are shown centrally aligned with the walls or co-axial with a longitudinal axis of the body, however these positions can vary to change the self-venting characteristics of the expansion chamber device 58.

It is anticipated that the positions of the extending portions 66, 74 away from the penetration location at the respective walls and close to the center of the inner chamber 68 provides additional vibration attenuation. For example, as the hydraulic fluid enters the inner chamber 68 from extending portion 66, vibrations from the vehicle drive train propagate through the hydraulic fluid as waves. Wave reflection is generated in substantially all directions within the inner chamber 68, thereby decreasing reflected vibration wave amplitude and improving vibration attenuation. Similar to the configuration discussed in reference to FIG. 4, by orienting the expansion chamber device 58 with the discharge line 70 facing upward (not shown), hydraulic fluid in the inner chamber 68 of the cylindrical body 60 will self-vent.

Referring to FIG. 6 and again to FIG. 2, the venting properties of the expansion chamber device 12 can be further improved by the addition of an inlet fitting 76 directly connected to the first end wall 26 of the body 22, which provides a hydraulic line connector 78, and a bleed or vent port 80. Similarly an outlet fitting 82 directly connected to the second end wall 30 of the body 22 can provide a hydraulic line connector 84, and a bleed or vent port 86.

Referring to FIG. 7, a graph provides exemplary test data comparing acceleration amplitude versus frequency for measured systems having no hydraulic vibration attenuation (curve 90); a 2.5 cm (1.0 in) diameter ×15.2cm (6.0 in) long expansion chamber device (curve 92); a 5.0 cm (2.0 in) diameter ×10.2 cm (4.0 in) long expansion chamber device (curve 94); and the 3.8 cm (1.5 in) diameter ×15.2 cm (6.0 in) long expansion chamber device 12 (curve 96). As evident by curve 96 at least 20 dB attenuation is achieved by the expansion chamber device 12 over a frequency ranging between approximately 50.0 Hz to approximately 225.0 Hz.

Vibration attenuators or expansion chamber devices of the present disclosure have no internal moving parts, do not include any internal vanes or flow restrictors, and do not include any internal flow deflectors. Material used for the expansion chamber devices of the present disclosure can include polymeric materials, composite materials, or metal. The expansion chamber devices can be positioned at any desired location along the clutch release line connected to the clutch master cylinder, or in the line leading to the clutch slave cylinder.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An expansion chamber device for clutch pedal vibration attenuation, comprising:
   a cylindrical body having an inlet line integrally connected to and penetrating through a first end wall of the body;
   a discharge line integrally connected to and penetrating a second end wall of the body, the second end wall is an outwardly tapered wall and is positioned at an opposite end of the body from the first end wall; and
   an inner chamber having a diameter larger than a diameter of the inlet line and larger than a diameter of the discharge line.

2. The expansion chamber device for clutch pedal vibration attenuation of claim 1, wherein the inlet line and the discharge line penetrate the respective first end wall and the second end wall centrally aligned with the wall and co-axially aligned with a longitudinal axis of the body.

3. The expansion chamber device for clutch pedal vibration attenuation of claim 1, wherein the second end wall of the expansion chamber device is vertically oriented such that the inlet line and the discharge line are also vertically oriented, allowing the expansion chamber device to self-vent via the discharge line.

4. The expansion chamber device for clutch pedal vibration attenuation of claim 1, wherein the inner chamber of the cylindrical body is approximately 6 times larger than the diameter of both the inlet line and the discharge line.

5. An expansion chamber device for clutch pedal vibration attenuation, comprising:
   a cylindrical body having an inlet line integrally connected to and penetrating through a first end wall of the body;
   a discharge line integrally connected to and penetrating a second end wall of the body, the second end wall positioned at an opposite end of the body from the first end wall; and
   an inner chamber having a diameter larger than a diameter of the inlet line and larger than a diameter of the discharge line;
   wherein the discharge line is positioned at an upper end defining a top center apex of the second end wall, allowing the expansion chamber device to self-vent via the top center apex of the second end wall and the discharge line.

6. The expansion chamber device for clutch pedal vibration attenuation of claim 1, wherein the inlet line includes an extending portion which discharges a fluid away from the first end wall and proximate to a center of the inner chamber.

7. The expansion chamber device for clutch pedal vibration attenuation of claim 1, wherein the discharge line includes an extending portion receiving a fluid away from the second end wall and proximate to a center of the inner chamber.

8. The expansion chamber device for clutch pedal vibration attenuation of claim 1, further including:
   an inlet fitting connected to the inlet line, the inlet fitting having a vent port acting to vent the inlet line; and
   an outlet fitting connecting to the outlet line, the outlet fitting having a vent port acting to vent the outlet line.

9. The expansion chamber device for clutch pedal vibration attenuation of claim 1, wherein a length of the expansion chamber device ranges between approximately 10.2 cm to approximately 15.2 cm.

10. The expansion chamber device for clutch pedal vibration attenuation of claim 1, wherein a diameter of the expansion chamber device ranges between approximately 2.5 cm to approximately 3.8 cm.

11. The expansion chamber device for clutch pedal vibration attenuation of claim 1, wherein the inlet line includes an extending portion extending past the first end wall permitting wave reflection from a fluid discharged from the inlet line to propagate in substantially all directions within the inner chamber of the expansion chamber device.

12. An expansion chamber device for clutch pedal vibration attenuation, comprising:
    a cylindrical body having an inlet line integrally connected to and penetrating through a first end wall of the body;
    a discharge line integrally connected to and penetrating a second end wall of the body, the second end wall positioned at an opposite end of the body from the first end wall; and
    an inner chamber having the inlet line and the discharge line both in fluid communication with the inner chamber, the inner chamber further having a diameter approximately six times larger than a diameter of the inlet line and larger than a diameter of the discharge line.

13. The expansion chamber device for clutch pedal vibration attenuation of claim 12, wherein:
    a length of the expansion chamber device cylindrical body ranges between approximately 10.2 cm to approximately 15.2 cm; and
    a diameter of the expansion chamber device cylindrical body ranges between approximately 2.5 cm to approximately 3.8 cm.

14. The expansion chamber device for clutch pedal vibration attenuation of claim 12, wherein:
    the first end wall of the expansion chamber device is a substantially flat wall; and
    the second end wall of the expansion chamber device is a substantially flat wall.

15. The expansion chamber device for clutch pedal vibration attenuation of claim 12, wherein:
    the first end wall of the expansion chamber device is a substantially flat wall; and
    the second end wall of the expansion chamber device is an outwardly tapered wall oriented vertically allowing the expansion chamber device to self-vent via the second end wall and the discharge line.

16. The expansion chamber device for clutch pedal vibration attenuation of claim 12, wherein the diameter of the inner chamber is approximately six times larger than the diameter of the discharge line.

17. The expansion chamber device for clutch pedal vibration attenuation of claim 12, wherein:
    the inlet line is coaxially aligned with a longitudinal center axis of the body; and
    the discharge line is positioned at an upper end defining a top center apex of the second end wall, allowing the expansion chamber device to self-vent via the top center apex of the second end wall and the discharge line.

18. A clutch system of a motor vehicle connected to a clutch pedal, comprising:
    a clutch release line containing a hydraulic fluid;
    a clutch slave cylinder line in fluid communication with the clutch release line; and
    an expansion chamber device for clutch pedal vibration attenuation, the expansion chamber device installed in and in fluid communication with at least one of the clutch release line and the clutch slave cylinder line, the expansion chamber device including:
        a cylindrical body having an inlet line integrally connected to and penetrating through a substantially flat first end wall of the body, the inlet line aligned coaxial with a longitudinal center axis of the body;
        a discharge line integrally connected to and penetrating a second end wall of the body, the second end wall defining an opposite end of the body from the first end wall; and
        an inner chamber having the inlet line and the discharge line both in fluid communication with the inner chamber, the inner chamber further having a diameter approximately six times larger than a diameter of the inlet line and approximately six times larger than a diameter of the discharge line, the expansion chamber device reducing vehicle and engine vibrations in a path including the clutch pedal over a frequency range between approximately 50 Hz to approximately 225 Hz.

* * * * *